United States Patent
Hecht et al.

(12)

(10) Patent No.: US 6,920,694 B2
(45) Date of Patent: Jul. 26, 2005

(54) SAW WITH A TOOL GUIDANCE MECHANISM WITH GUIDE ELEMENTS ADJUSTABLE TO THE TOOL SIZE

(75) Inventors: Joachim Hecht, Magstadt (DE); Klaus Wurst, Leinfelden-Echterdingen (DE); Stephan Jonas, Stuttgart (DE); Siegfried Keusch, Deizisau (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 10/129,477

(22) PCT Filed: Jul. 19, 2001

(86) PCT No.: PCT/DE01/02716

§ 371 (c)(1),
(2), (4) Date: May 6, 2002

(87) PCT Pub. No.: WO02/22297

PCT Pub. Date: Mar. 21, 2002

(65) Prior Publication Data

US 2002/0178591 A1 Dec. 5, 2002

(30) Foreign Application Priority Data

Sep. 16, 2000 (DE) ........................................ 100 45 890

(51) Int. Cl.⁷ .............................................. B23D 51/02
(52) U.S. Cl. ........................................................ 30/392
(58) Field of Search ............................... 30/392; 83/761, 83/762, 821, 828, 829, 827, 823–826

(56) References Cited

U.S. PATENT DOCUMENTS

| 344,175 | A | * | 6/1886 | East ............................. 83/827 |
| 930,228 | A | * | 8/1909 | Rennie ......................... 83/828 |
| 2,327,167 | A | * | 8/1943 | Bratek et al. ................. 83/821 |
| 2,782,811 | A | * | 2/1957 | Johnson ....................... 83/829 |
| 4,665,617 | A | * | 5/1987 | Maier et al. .................. 30/392 |
| 4,837,935 | A | * | 6/1989 | Maier et al. .................. 30/392 |
| 4,972,746 | A |   | 11/1990 | Ohnishi |
| 5,644,847 | A | * | 7/1997 | Odendahl et al. ............. 30/392 |

FOREIGN PATENT DOCUMENTS

| DE | 85 07 818 U |   | 2/1987 |
| DE | 198 04 706 A |   | 8/1998 |
| DE | 198 28 888 A |   | 1/1999 |
| DE | 299 10 173 U |   | 9/1999 |
| DE | 29910173 | * | 9/1999 |
| EP | 0521263 | * | 1/1993 |

* cited by examiner

Primary Examiner—Stephen Chol
(74) Attorney, Agent, or Firm—Michael J. Striker (57) ABSTRACT

A hand-guided saber saw, has a drive unit by way of which a tool, in particular a saw blade, can be driven, and with a tool guide mechanism, by way of which the tool can be guided laterally by guide elements, and the tool guide mechanism has a control motor, by way of which a spacing between the guide elements can be adjusted to a tool thickness, and the tool guide mechanism has pivot arms, connected via a joint, on which arms the guide elements are disposed.

11 Claims, 7 Drawing Sheets

SAW WITH A TOOL GUIDANCE MECHANISM WITH GUIDE ELEMENTS ADJUSTABLE TO THE TOOL SIZE

BACKGROUND OF THE INVENTION

The invention is base on a saw with a tool guide mechanism.

From German Utility Model DE 299 10 173 U1, a saw of this generic type is known, specifically a hand-guided saber saw. The saber saw has a drive unit, to which a saw table is secured. Via the drive unit, a saw blade can be driven periodically with an up-and-down motion. The saw blade is secured by one end in the drive unit and beginning at the drive unit extends downward, perpendicular to a working direction, through the saw table and with its free end protrudes past the saw table.

To prevent the saw blade from deflecting laterally in response to the transverse forces that occur in the sawing process, as can occur especially when cutting radii, a tool guide mechanism is provided. The tool guide mechanism has two support arms, disposed laterally of the saw blade, on which arms so-called stabilizing elements or guide elements are secured, which rest laterally on the saw blade and guide it laterally. The support arms are joined together via an adjusting screw, so that a spacing between the guide elements can be adjusted manually by a user to a saw blade thickness. A securing bracket is also secured to the support arms; it precedes the saw blade in the machining direction and forms a touch guard.

SUMMARY OF THE INVENTION

The invention is based on a saw, in particular a hand-guided saber saw, which has a drive unit by way of which a tool, in particular a saw blade, can be driven, and with a tool guide mechanism, by way of which the tool can be guided laterally by guide elements.

It is proposed that the tool guide mechanism has a control motor, by way of which a spacing between the guide elements can be adjusted to a tool thickness. The ease of use can be enhanced, especially if the tool guide mechanism is adjusted automatically via the control motor, as soon as a new tool is secured in the saw. However, the control motor could certainly be activated by a manual actuation, for instance of a switch. Moreover, with automatic adjustment, an advantageous guide adjustment and an attendant optimal outcome of sawing are always assured. An incorrect adjustment is avoidable.

The control motor can have an electrical, electromagnetic, pneumatic, hydraulic, chemical and/or biochemical drive mechanism, with a linearly and/or rotationally moved power takeoff, and so forth. Especially advantageously, however, the control motor has a spring drive mechanism, and as a result it can be embodied especially simply in terms of construction as well as especially economically and sturdily.

An undesired opening of the tool guide mechanism can be achieved by means of various nonpositive- and/or positive-engagement mechanisms that appear useful to one skilled in the art, such as a detent mechanism that snaps into place as soon as a desired position is reached; the desired position can in turn be detected by various sensors, such as optical, mechanical and/or electrical sensors, and so forth.

Fundamentally, it is also conceivable to make the closing forces of the control motor greater than the transverse forces typically occurring during operation.

However, if after an adjustment operation, the tool guide mechanism is kept in its closing position by a nonpositive-engagement clamping mechanism based on self-locking, an infinitely variable adjustment can be attained in a structurally simple and economical way with only a few components and little additional weight, and an undesired opening of the tool guide mechanism can be securely avoided. Especially in a control motor with a spring drive mechanism, the spring elements can be embodied as small, lightweight and economically, and high friction can be avoided as a consequence of a high continuous contact pressure of the guide elements of the tool guide mechanism against the tool.

The self-locking can be achieved by a thread, for instance of an adjusting screw driven by an electric motor, or by some other component corresponding with an oblique face, and so forth.

In a further feature of the invention, it is proposed that the tool guide mechanism has pivot arms, connected via a joint, on which arms guide elements are disposed, as a result of which, a symmetrical positioning of the guide elements from two sides against the tool can be achieved in a structurally simple and space-saving way with a control motor. If the pivot arms are drivable in their pivoting motion via oblique faces, then a desired self-locking in the opening position of the tool guide mechanism can be realized in a simple way.

It is also proposed that the oblique faces are formed by a displaceably supported bearing component, which forms a part of the control motor and is urged in the direction of its closing position via at least one spring element, and that for opening the tool guide mechanism, a control device is displaceable out of its closing position into an opening position via a control element. The self-locking can be undone easily by a user, and a structurally simple tool guide mechanism with only a few additional components can be achieved.

If the guide elements are disposed on a first side of the joint of the pivot arms, and the control motor is disposed on a second side of the joint, the installation space can advantageously be utilized, and the control motor can be disposed in concealed fashion in a housing of the saw and thereby protected from external factors. Moreover, this prevents the control motor from impairing the view of the tool and the workpiece.

If the pivot arms of the tool guide mechanism precede the tool in the machining direction, then these arms can advantageously form a guard device or a touch guard. Additional components, weight, assembly effort and expense for a corresponding guard device can be avoided.

The operation of adjusting the tool guide mechanism takes place as a rule after a tool change. If a control device for opening the tool guide mechanism is coupled at least operatively with a control device of a fastening mechanism of the tool, specifically in such a way that upon opening of the fastening mechanism the tool guide mechanism is simultaneously opened, then actuation operations that a user must perform can be avoided, and the ease of use can be enhanced still further. Moreover, additional components can be dispensed with if the control device for opening the tool guide mechanism is embodied at least partly integrally with the control device of the fastening mechanism of the tool.

In a further feature of the invention, it is proposed that the tool guide mechanism can be kept in an opening position via a retaining device after the removal of the tool. An automatic positioning before the insertion of a new tool, and thus a requisite opening for inserting a new tool, can advantageously be avoided. After the new tool has been introduced, the retaining mechanism can be released either manually or advantageously automatically by the introduction of the tool.

If the guide elements of the tool guide mechanism are formed by roller bodies, then especially slight friction, a low power loss, and little wear can be achieved. To avoid high pressure per unit of surface area between the guide elements and the tool, the roller bodies can be adapted to the contour of the tool, or can be made adaptable. The roller bodies can be formed by concave, convex or cylindrical rollers or by balls and so forth. Instead of roller bodies, the guide elements of the tool guide mechanism can advantageously be formed of ceramic parts, which can be made especially wear-resistant. In addition, retaining elements can simply be formed onto ceramic parts, examples being detent elements or a thread and so forth. In principle, however, guide elements made of other materials that appear useful to one skilled in the art, such as hard metal, and so forth, are also conceivable.

If the guide elements are held by detachable retaining elements and are replaceable, then with economical guide elements a long service life of the tool guide mechanism can be attained. Moreover, guide elements with good lubricating properties, which besides a guide function lubricate the tool, can be used, such as carbon-based guide elements, and so forth.

The embodiment of the invention can be employed in various stationary and hand-guided saws that appear appropriate to one skilled in the art, such as band saws and so forth. Especially advantageously, however, the embodiment of the invention is employed in hand-guided saber saws. In hand-guided saber saws, a tool change is a rule done frequently, so that in such saws, an especially major enhancement to the ease of use can be attained with the embodiment of the invention.

BRIEF DESCRIPTION OF THE DRAWINGS

Further advantages will become apparent from the ensuing description of the drawing. In the drawings, one exemplary embodiment of the invention is shown. The drawings, description and claims include numerous characteristics in combination. One skilled in the art will expediently consider the characteristics individually as well and put them together to make useful further combinations.

Shown are.

DESCRIPTION OF THE PREFERRED EMBODIMENT

Figure 1:
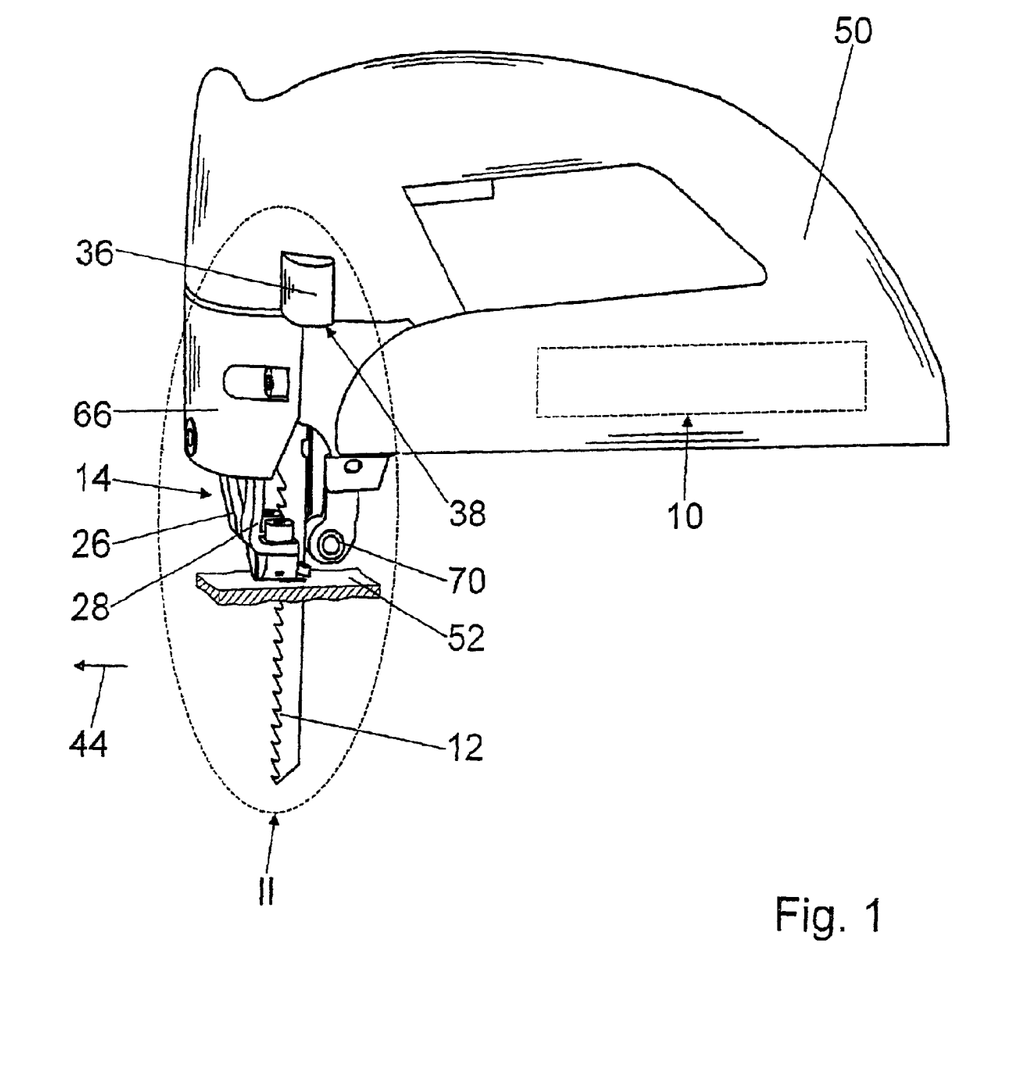
FIG. 1, a saber saw shown schematically obliquely from above.
Figure 2:
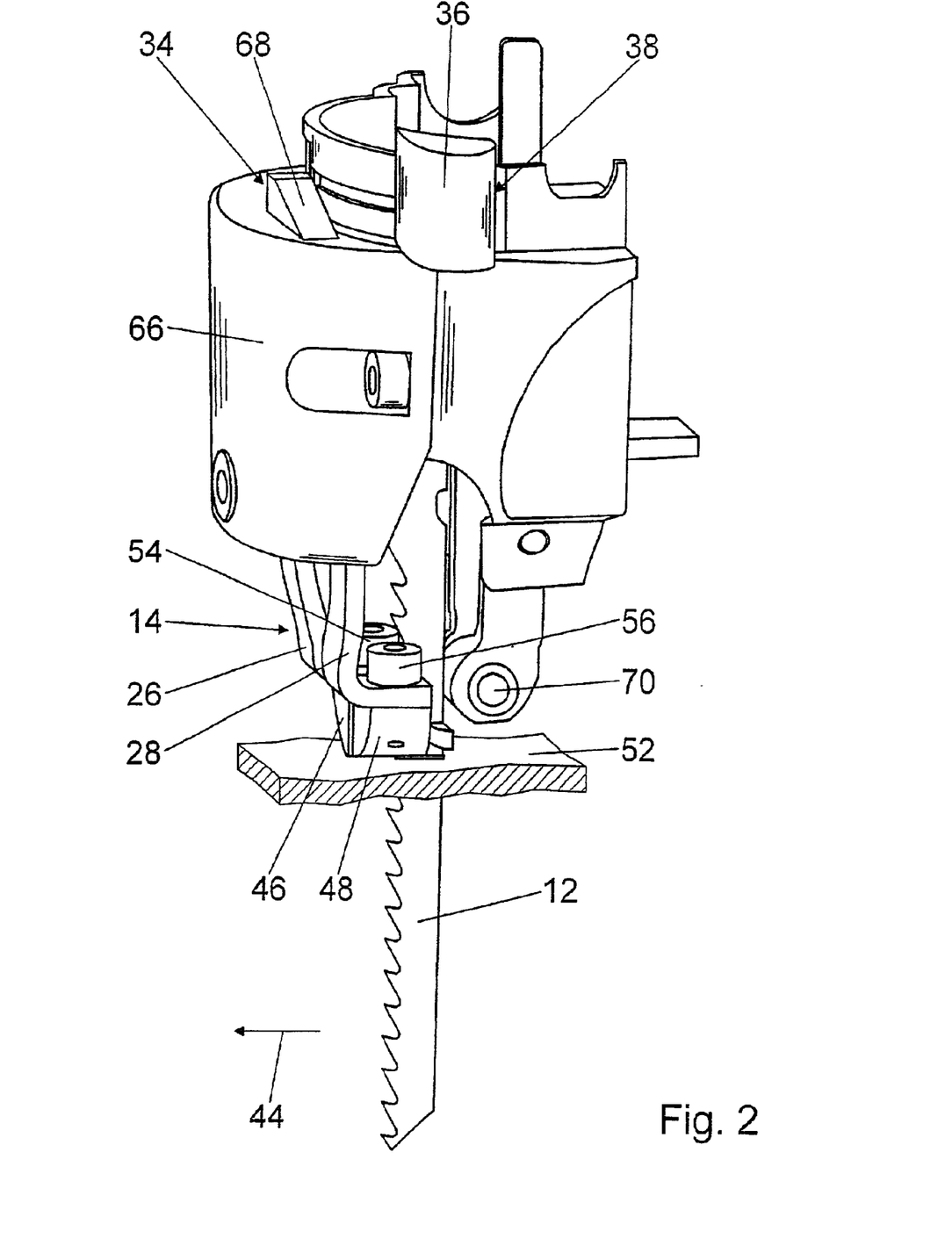
FIG. 2, a detail II of FIG. 1, shown enlarged and including a tool guide mechanism.
Figure 3:
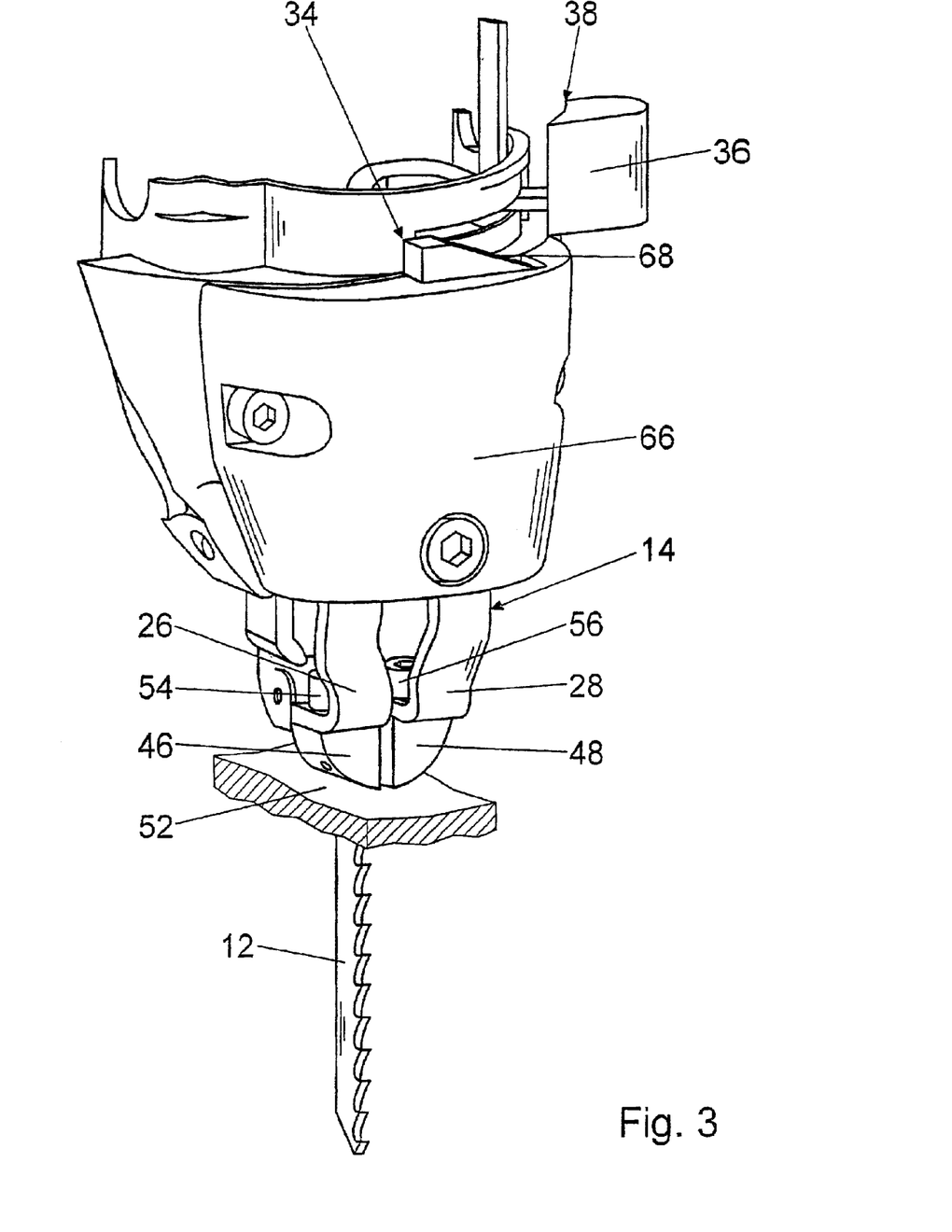
FIG. 3, the detail II obliquely from the front.

FIG. 1 schematically shows a hand-guided saber saw obliquely from above; it has an electric motor 10, not shown in further detail, disposed in a housing 50. In the saber saw, a saw blade 12 is secured, which is firmly joined by its first end in the housing 50 to a gear unit driven by the electric motor 10 and extends downward, beginning at the first end, perpendicular to the machining direction 44, through a saw table 52 shown only in suggested fashion in FIG. 1. With the electric motor 10, via the gear unit, the saw blade 12 can be driven periodically up and down in a reciprocating motion, essentially perpendicular to a machining direction 44. On a side remote from a working side of the saw blade 12, the saw blade 12 is braced against a support roller 70, by way of which the saw blade 12 can be driven, swinging in the machining direction 44.

Figure 4:
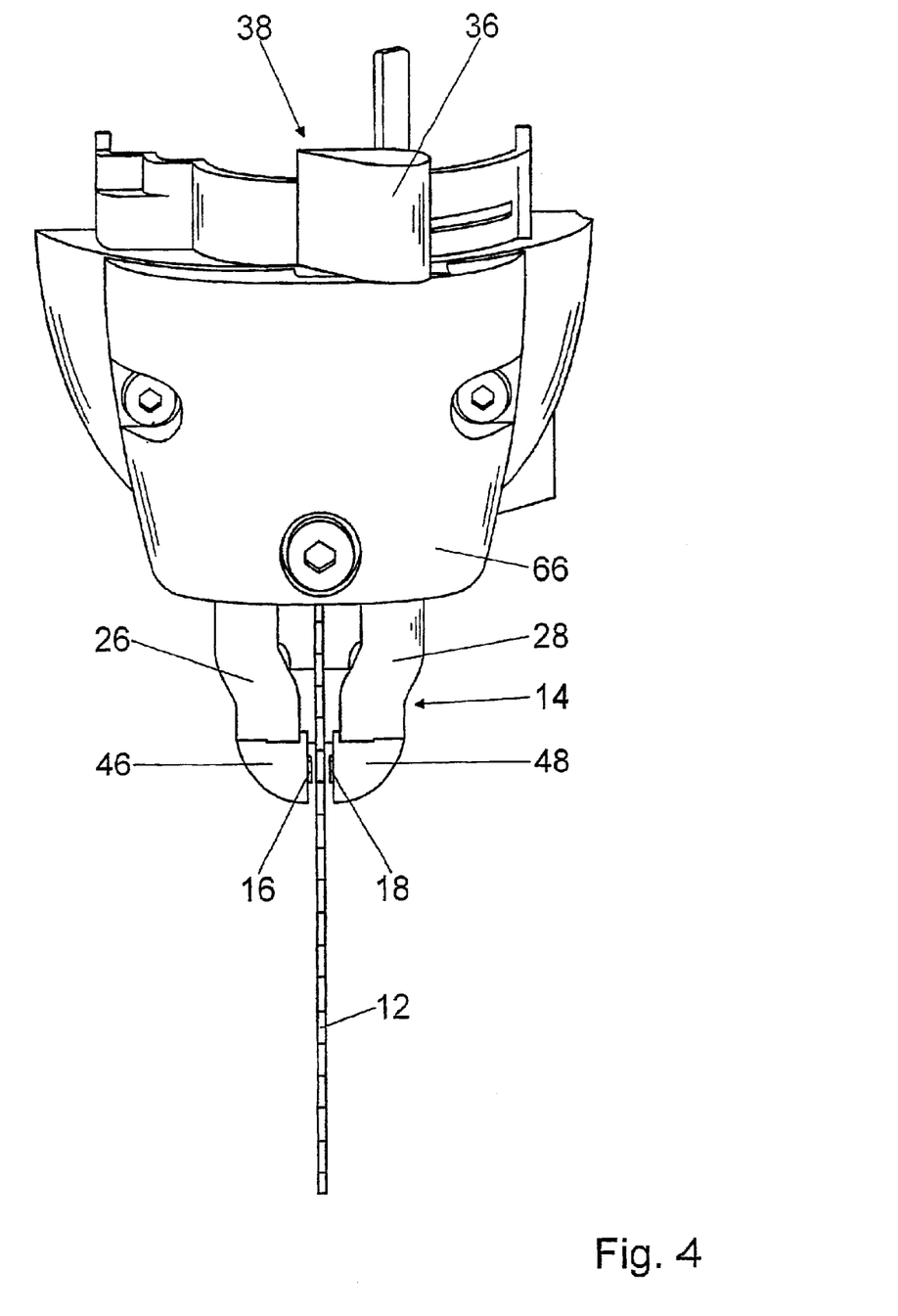
FIG. 4, the detail II directly from the front.
Figure 5:
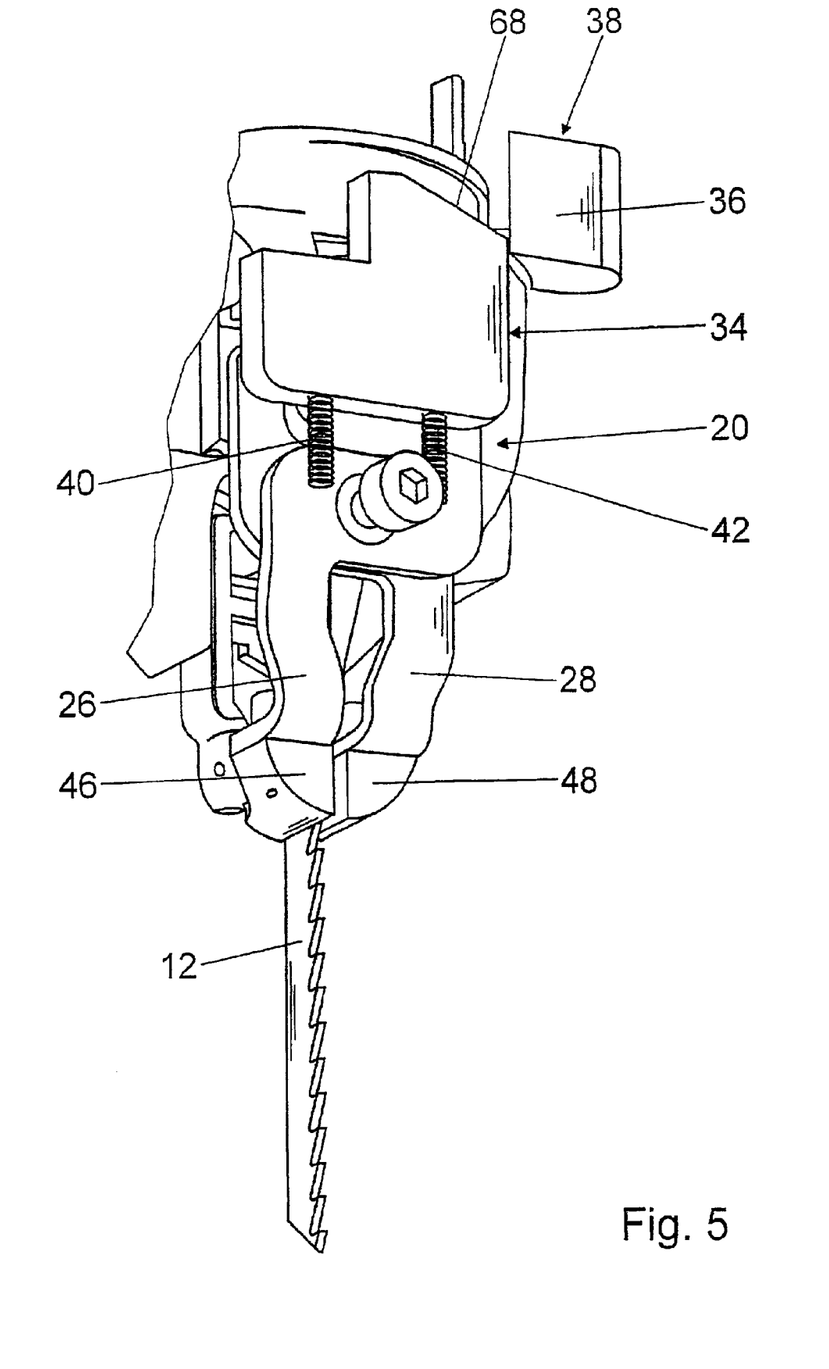
FIG. 5, the detail II obliquely from the front without the cover.
Figure 6:
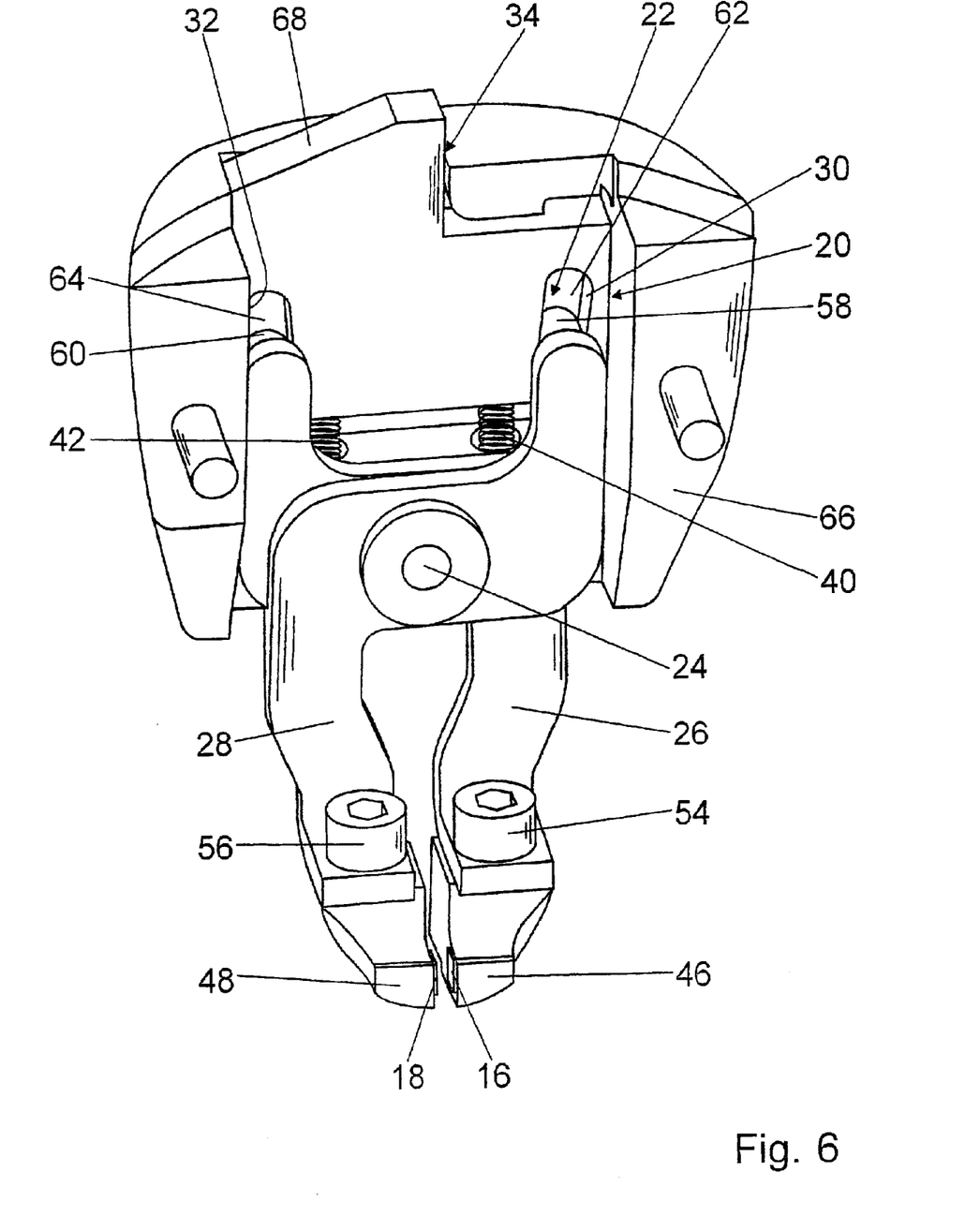
FIG. 6, the tool guide mechanism of FIG. 2 from behind.
Figure 7:
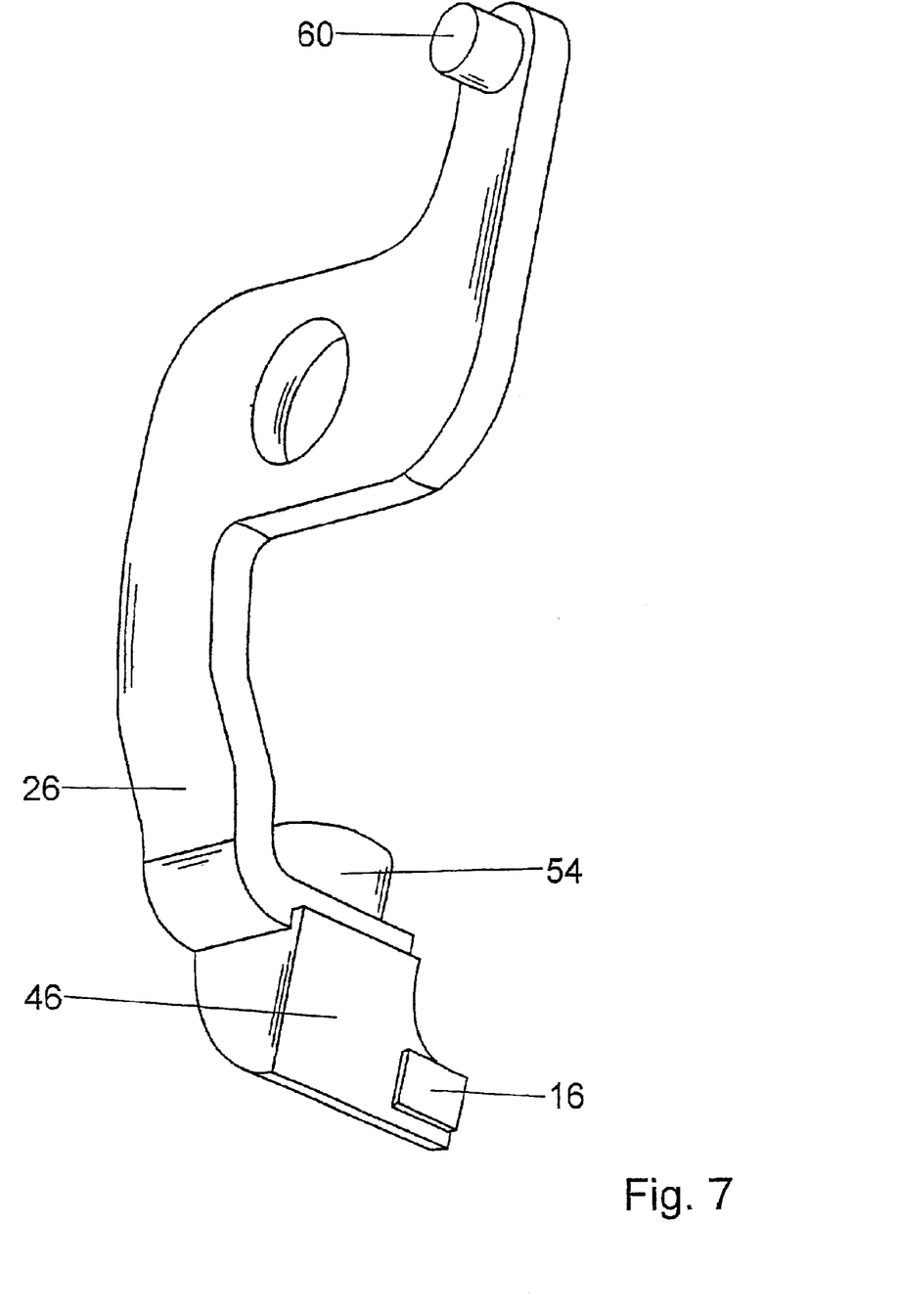
FIG. 7, a single pivot arm of the tool guide mechanism of FIG. 2, in the dismantled state.

The saber saw also has a tool guide mechanism 14, by way of which the saw blade 12 can be guided laterally with guide elements 16, 18 (FIGS. 1 and 4). According to the invention, the tool guide mechanism 14 has a control motor 20 with a spring drive mechanism, by way of which a spacing between the guide elements 16, 18 is adjustable to a saw blade thickness. The tool guide mechanism 14 has two pivot arms 26, 28, joined via a joint 24, to which arms the guide elements 16, 18, formed of ceramic parts, are secured on one end via retaining elements 46, 48 (FIGS. 2-7). The pivot arms 26, 28 form a kind of guide tongs. The guide elements 16, 18 are glued to the retaining elements 46, 48, which are secured releasably and replaceably to the pivot arms 26, 28 via fastening screws 54, 56.

Guide bolts 58, 60 (FIG. 6 and FIG. 7) are formed onto a second end of the pivot arms 26, 28. The guide bolts 58, 60 protrude in the actuation direction 44 into grooves 62, 64 of a bearing component 34, which grooves are embodied such that they diverge slightly obliquely, in the longitudinal direction of the saw blade 12, relative to the housing 50, at an angle of less than 6°. By oblique faces 30, 32 of the bearing component 34 in the grooves 62, 64, the pivot arms 26, 28 can be driven in their pivoting motion. The bearing component 34 is supported displaceably parallel to the longitudinal direction of the saw blade 12 and forms one part of the control motor 20, specifically because the bearing component 34 is urged in the direction of its closing position, that is, in the longitudinal direction of the saw blade 12 relative to the housing 50, via two helical compression springs 40, 42. The helical compression springs 40, 42 are each braced by an end remote from the bearing component 34 on contact faces, not identified by reference numeral, formed on a cover 66. The control motor 20, formed by the bearing component 34 and the helical compression springs 40, 42, is concealed behind the cover 66 on the side of the joint 24 remote from the guide elements 16, 18 and thus protected against external factors.

For changing the saw blade 12, a displaceably supported control element 36 of a control device 38 of the tool guide mechanism 14 is displaced crosswise to the machining direction 44, along an oblique face 68 formed onto the bearing component 34, as a result of which the bearing component 34 is displaced out of its closing position into its opening position, in the longitudinal direction, remote from the housing 50, of the saw blade 12. The guide bolts 58, 60 are guided and pivoted apart along the oblique faces 30, 32, as a result of which the guide elements 16, 18, disposed on the opposite side of the joint 24, are likewise pivoted apart and lift away from the saw blade 12.

The control element 36 of the control device 38 of the tool guide mechanism 14 is embodied integrally with a control element of a fastening mechanism, not identified by reference numeral, of the saw blade 12; specifically, by the displacement of the control element 36 in the direction of the oblique face 68 of the bearing component 34, the fastening mechanism of the saw blade 12 is released, and the saw blade 12 is ejected.

As long as a new saw blade 12 is not introduced into the saber saw and secured via the fastening mechanism, the tool guide mechanism 14 and the bearing component 34 are held in their opening position by a detent mechanism, not identified by reference numeral, so that by means of the guide elements 16, 18, a new saw blade 12 can simply be introduced into the saber saw or into the fastening mechanism. Without such a detent mechanism, the bearing component 34, for introducing a new saw blade 12, would have to be displaced into its opening position, for instance by means of the control element 36. The control element 36 is returned via a restoring spring, not identified by reference numeral.

When the new saw blade 12 is introduced, simultaneously with the fastening of the saw blade 12 by the fastening mechanism, the detent mechanism is released, and the bearing component 34 is displaced in its closing position by the helical compression springs 40, 42. The guide bolts 58, 60 are guided in the grooves 62, 64 along the oblique faces 30, 32 and are pivoted toward one another, as a result of which the guide elements 16, 18 are likewise pivoted toward one another and rest laterally on the saw blade 12. The tool guide mechanism 14 adjusts automatically to a thickness of a given saw blade 12 employed, and a spacing between the guide elements 16, 18 is adjustable to saw blades with a thickness between 0.8 and 1.7 mm.

The guide bolts 58, 60 and the oblique faces 30, 32 of the bearing component 34 form a clamping mechanism 22, by which the pivot arms 26, 28 of the tool guide mechanism 18, after the adjustment operation, are kept in the closing position by self-locking. The guide bolts 58, 60 the oblique faces 30, 32 of the bearing components 34 and the Divot arms 26, 28 of together form a self-locking clamping mechanism.

| Reference Numerals | |
| --- | --- |
| 10 | Drive unit |
| 12 | Tool |
| 14 | Tool guide mechanism |
| 16 | Guide element |
| 18 | Guide element |
| 20 | Control motor |
| 22 | Clamping mechanism |
| 24 | Joint |
| 26 | Pivot arm |
| 28 | Pivot arm |
| 30 | Oblique face |
| 32 | Oblique face |
| 34 | Bearing component |
| 36 | Control element |
| 38 | Control device |
| 40 | Spring element |
| 42 | Spring element |
| 44 | Machining direction |
| 46 | Retaining element |
| 48 | Retaining element |
| 50 | Housing |
| 52 | Saw table |
| 54 | Fastening screw |
| 56 | Fastening screw |
| 58 | Guide bolt |
| 60 | Guide bolt |
| 62 | Groove |
| 64 | Groove |
| 66 | Cover |
| 68 | Oblique face |
| 70 | Support roller |

What is claimed is:

1. A hand guided saber saw, comprising a drive unit for driving a tool formed as a saw blade; a tool guide mechanism comprising guide elements for laterally guiding the tool; the tool guide mechanism having a control motor for adjusting a spacing between the guide elements to a tool thickness; the control motor comprising a bearing component supported displaceably parallel to a longitudinal direction of the saw blade and being spring loaded in a direction of its closing position and supported displaceably relative to the guide elements for driving the guide elements via oblique faces.

2. A hand guided saber saw as defined in claim 1, wherein the tool guide mechanism has pivot arms connected via a joint, the guide elements being disposed on the pivot arms, the pivot arms being drivable in their pivoting motion by the oblique faces.

3. A hand guided saber saw as defined in claim 2, wherein the pivot arms comprise guide bolts protruding into the grooves.

4. A hand guided saber saw as defined in claim 2, wherein the oblique faces are formed in grooves in the bearing component, and the pivot arms comprise guide bolts protruding into the grooves.

5. A hand guided saber saw as defined in claim 1, wherein the oblique faces are formed in grooves in the bearing component.

6. A hand guided saber saw as defined in claim 1, and further comprising a self-locking clamping mechanism formed so that after an adjustment operation the tool guide mechanism is kept in its closing position by the clamping mechanism.

7. A hand guided saber saw as defined in claim 1, wherein the pivot arms are arranged so that they preceded the tool in a machining direction and form a guard device.

8. A hand guided saber saw as defined in claim 1, wherein the tool guide mechanism comprises a control device with control element; whereby upon a displacement of the control element along an oblique face the bearing component is displaced out of its closing position into its opening position.

9. A hand guided saber saw as defined in claim 1, wherein the tool guide mechanism comprises a control device with a control element; whereby upon a displacement of the control element the guide elements lift away from the saw blade and upon a release of the control element a spacing between the guide elements adjusts automatically to a thickness of the saw blade.

10. A hand-guided saber saw as defined claim 1, wherein the guide elements are formed of ceramic parts.

11. A hand-guided saber saw as defined in claim 1, and further comprising detachable retaining elements, the guide elements being held by the detachable retaining elements and being replaceable.

* * * * *